April 9, 1929.  S. A. CRONE  1,708,121
RAILWAY BRAKE BEAM SUPPORT
Filed Jan. 11, 1927  2 Sheets-Sheet 2
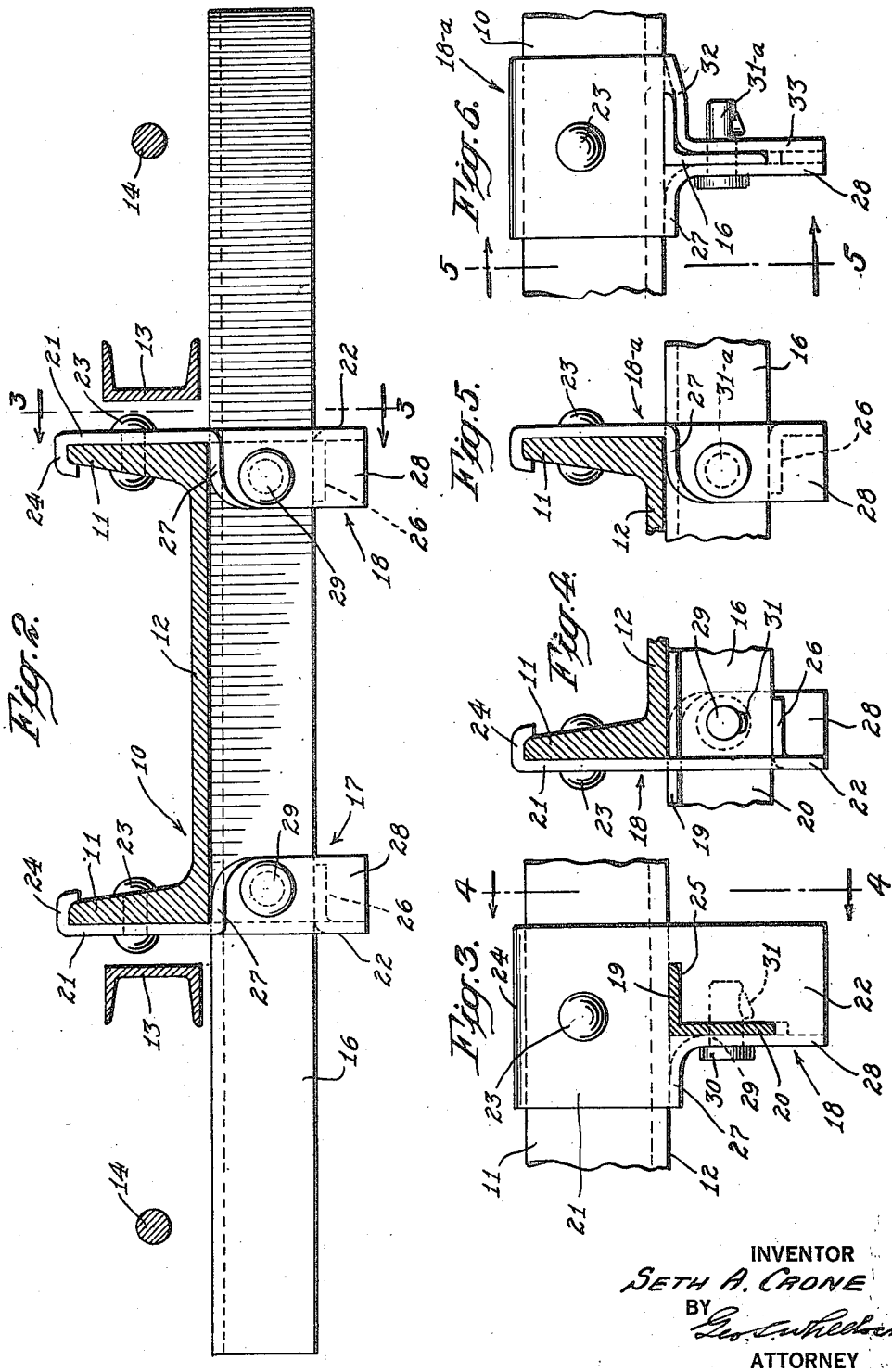
INVENTOR
SETH A. CRONE
BY
ATTORNEY Patented Apr. 9, 1929.

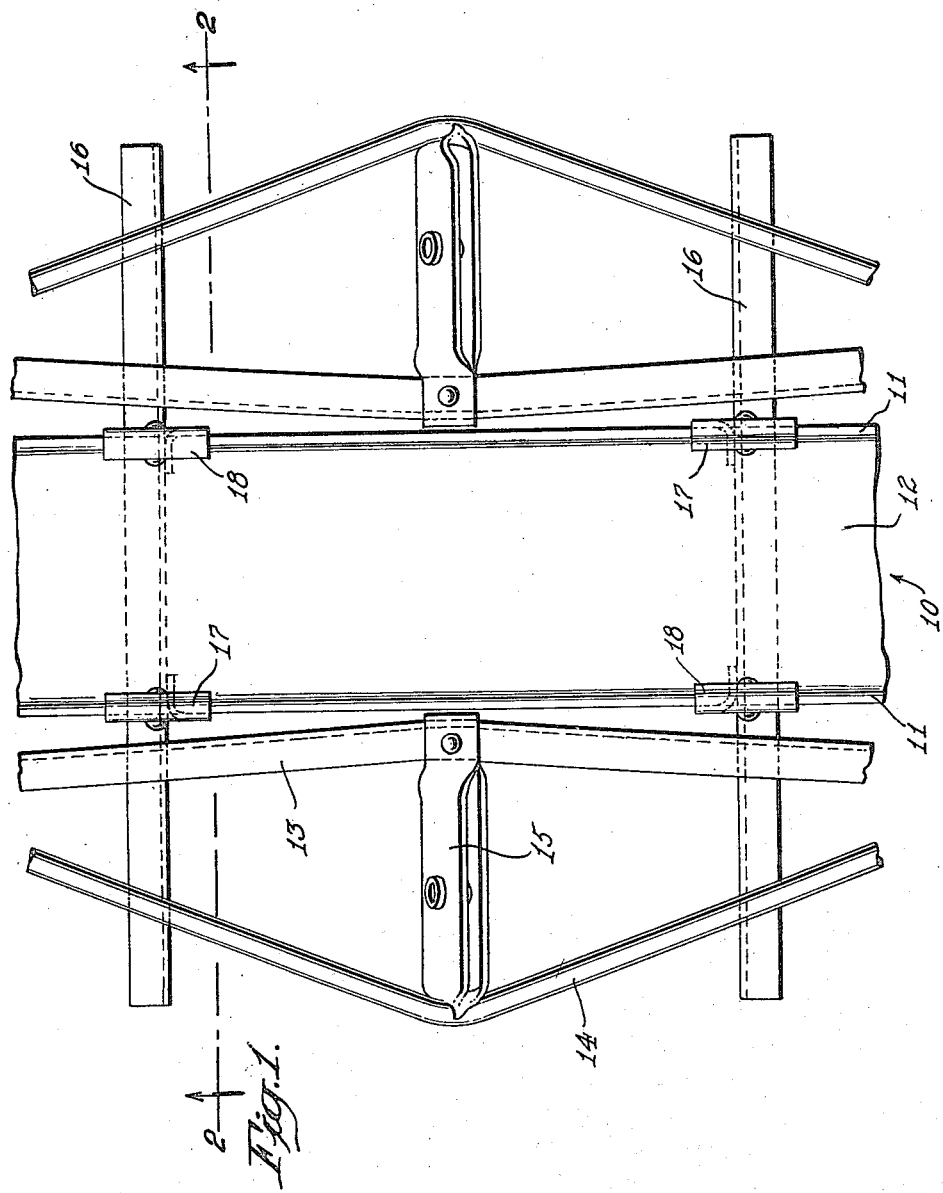

1,708,121

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

RAILWAY-BRAKE-BEAM SUPPORT.

Application filed January 11, 1927. Serial No. 160,421.

This invention relates to improvements in railway brake beam supports, and has particular reference to emergency safety supporting bars and holding means whereby they may be attached to the spring plank or other part of a railway car-truck.

It sometimes happens that the brake beam mechanisms of railway car-trucks become detached from their mountings due to wear, breakage, or loss of certain parts, and in order to prevent serious accidents resulting from a detached brake beam falling under and in the path of the car wheels, safety supporting bars or emergency bars are employed. Such supporting bars have comprised various structural steel shapes secured to the spring plank of the truck, the bars extending longitudinally below and normally free of said beams, and being detachably held in suitable brackets. In some running gears available space for the attachment of the supporting bars to the spring plank is limited, giving rise to difficulties, and this has been particularly true in those structures wherein the brake beam is positioned close to the side flange of the spring plank, and where the emergency bars must be held close up to the bottom of the spring plank.

An important object of the invention in its broader aspects is to provide an emergency safety supporting bar and mounting bracket therefor which may be firmly secured on a car truck and which will require a minimum amount of space for its attachment.

Another object is to provide a mounting bracket of the above mentioned character which will be simple in construction, strong and durable in service, economical to manufacture, and a substantial advance in the art.

More specifically the invention contemplates the formation of a safety bar supporting bracket from sheet metal, the bracket having an attaching portion for securement to the spring plank and a depending portion extending below the spring plank. The depending portion of the bracket is characterized by a web which is in substantially the same plane as the outer side of the spring plank and which is provided with an aperture of the same configuration as the cross-section of the safety bar to be employed. Preferably the safety bar is formed from a flanged structural steel element and in the drawings by way of illustration, said safety bar has been shown in the form of an angle. Preferably a portion of the web from the aperture is deflected inwardly at the lower edge of the opening in such a manner as to provide an extended bearing for the lower edge of the bar and in addition a portion of said web beside the aperture is deflected inwardly in the form of a pair of relatively perpendicular flanges. One of said flanges is adapted to seat against the lower side of the spring plank, while the other flange provides a relatively flat bearing for one side of the angle bar, and said last mentioned flange may preferably be apertured in alignment with corresponding apertures in the bar to permit of the insertion of a locking pin or other suitable fastening means whereby the bar is detachably secured to the bracket.

These and other objects, features and advantages of the invention will be readily apparent from the following description when taken in connection with the accompanying drawings, wherein the invention has been shown by way of illustration and wherein Figure 1 is a fragmentary top plan view of a brake beam mechanism for railway car trucks provided with emergency safety bars and supporting brackets therefor in accordance with this invention;

Figure 2 is a vertical transverse sectional view on the line 2—2 of Figure 1 and looking in the direction of the arrows;

Figure 3 is a vertical transverse sectional view through the safety bar on the line 3—3 of Figure 2;

Figure 4 is a sectional view on the line 4—4 of Figure 3 and showing more clearly the inner side of the supporting bracket;

Figure 5 is a view similar to Figure 4 of a modified form of the invention, the section being taken on line 5—5 of Fig. 6, and Figure 6 is a front elevation of the modification illustrated in Figure 5.

The invention may be applied to various types of railway car-trucks, one form of equipment being shown in Figures 1 and 2, wherein a spring plank 10 is provided in the form of a steel channel beam, having longitudinal side flanges 11 and a connecting web 12. The usual brake-beam mechanisms are disposed longitudinally at the opposite sides of the spring plank, and in the illustrated embodiment they have been shown as close-hung with reference thereto. Each brake-beam mechanism preferably includes a brake-beam 13 and a compression member 14 connected together intermediate their ends by the usual strut 15, as is well understood by those skilled in the art.

Mounted below the spring plank 10 and extending outwardly from the sides thereof below the brake-beam mechanisms are a pair of spaced emergency safety supporting bars 16, 16, each of which is detachably supported by and in a pair of supporting brackets 17 and 18. The safety bars 16, 16 are alike in all respects, and are preferably formed of flanged structural elements, for example, angle bars, each having a substantially horizontal flange 19, and a substantially vertical flange 20, but other usual or preferred shapes may be employed, if desired. The brackets 17 and 18 are similar to each other in general characteristics, but are preferably made in right-hand and left-hand form, and a detail description of one is sufficient for a complete understanding of the invention.

Referring particularly to Figures 2, 3, and 4, it will be seen that each of the improved supporting brackets includes an attaching portion 21 and a depending portion 22, and can easily be formed of a substantially rectangular blank of sheet metal. The attaching portion 21 extends downwardly at the outer side of the spring plank flange 11, and is secured thereto in any suitable manner such as by a rivet 23. Preferably the upper edge of the bracket is formed with an inwardly extending flange 24, adapted to engage the upper edge of flange 11, whereby to relieve the rivet 23 of shearing strains. The depending portion 22 is in the form of a web which is preferably continuous with the attaching portion 21 and in substantially the same plane as the side of the spring plank. Said web of the depending portion is provided with an aperture 25 which preferably is of the same shape as the cross-sectional configuration of the flanged safety bar 16, the arrangement being such that the apertures 25 in a pair of opposed brackets 17 and 18 are in alinement for the longitudinal passage therethrough of the safety bar. Preferably a portion of the web material from the apertures 25 is deflected inwardly as at 26 to provide an extended bearing or seat for the lower edge of the vertical flange 20 of the safety bar, and in the illustrated embodiment the proportions are such that said safety bar is snugly received between said bearing portion 26 and the bottom of the spring plank.

The depending portion 22 is further characterized by an inwardly deflected portion at one side of the aperture 25 providing a substantially horizontal flange member 27 which is adapted to seat against the bottom of the spring plank, and an integral substantially vertical flange 28 which provides a relatively flat bearing surface for engagement with one side of the safety bar flange 20. In order that the safety bar may be detachably held in the supporting bracket, the bar flange 20 and bracket flange 28 are provided with alined transverse openings through which the body of a locking pin 29 or other suitable fastening element may be disposed, said locking pin in the drawings being of a well known form and having at one of its ends an enlarged head 30 and adjacent its other end a yieldable keeper 31 which is preferably self locking.

In use the brackets 17 and 18 are firmly secured to the spring plank 10, and the safety bars 16 are effectively supported below the brake-beam mechanisms in such a manner as to prevent such mechanisms from falling in the path of the car-truck wheels in the event that said mechanisms should become loosened from their mountings. In view of the fact that the apertures 25 in the brackets are of the same shape as the safety bars in cross-section, and further, in view of the fact that the extended bearing portions 26 and 28 are provided, it will be evident that the safety bars will be very rigidly held with reference to the spring plank and will be easier to insert because of the guidance which they receive from said bearing portions.

In Figures 5 and 6 a modified form of the invention has been illustrated, in which the bracket 18ª embodies the features of the previously described bracket 18, but is further characterized by having the web portion 22 deflected inwardly below the spring plank at both sides of the safety bar. Thus, in addition to the flange portions 27 and 28, the depending portions of the bracket 18ª has a pair of substantially perpendicular flanges 32 and 33 which respectively engage the lower side of the safety bar flange 19 and the inner side of the safety bar flange 20. In this form of the invention, the bracket flanges 28 and 33 are provided with alined apertures for the reception of the body of a locking pin 31ª.

It will be evident from the foregoing that an improved arrangement of emergency safety bars and supporting means therefor have been provided for railway brake-beam mechanism, and that the brackets will be economical to manufacture and apply because of the simplicity of their construction and that they will be exceptionally strong and durable in service. Obviously, the invention is susceptible of further modification in the details of construction and arrangements of parts, and the right is herein reserved to make such changes as fall within the scope of the appended claims without departing from the spirit of the invention.

Having thus described my invention, what I claim, is:

1. A supporting bracket for safety bars and the like, comprising a metallic member adapted to be secured to the spring plank of a car truck, the lower portion of said member having an aperture corresponding to the cross-sectional configuration of a flanged safety bar, and an inwardly extending portion providing a flat bearing surface for one side of the safety bar, said inwardly extending portion being adapted to seat against the lower surface of a spring plank.

2. A supporting bracket for safety bars and the like, comprising a metallic member adapted to be secured to the spring plank of a car truck, the lower portion of said member having an aperture, having an angular shape corresponding in configuration with the cross-sectional configuration of a flanged safety bar, and an inwardly extending portion providing an extended bearing for one side of a vertical flange of the safety bar.

3. A supporting bracket for safety bars and the like, comprising a metallic member adapted to be secured to the spring plank of a car truck, the lower portion of said member having an aperture corresponding to the cross-sectional configuration of a flanged safety bar, material from said aperture being deflected to provide an extended seat to support the safety bar, and part of said lower portion of the bracket being deflected inwardly to provide a flat bearing surface for one side of the safety bar.

4. A supporting bracket for safety bars and the like, comprising a metallic member adapted to be secured to the spring plank of a car truck, the lower portion of said member having an aperture corresponding to the cross-sectional configuration of a flanged safety bar, material from said aperture being deflected inwardly to provide an extended seat to support the safety bar, and part of said lower portion of the bracket being deflected inwardly to provide an extended flat bearing for a substantially vertical flange of the safety bar.

5. A supporting bracket for safety bars and the like, comprising a metallic member having an upper attaching portion adapted to be secured to the spring plank of a car truck, and a depending portion substantially continuous with said attaching portion, said depending portion having an aperture corresponding to the cross-sectional configuration of a flanged safety bar, and being deflected inwardly at one side of the aperture to provide an extended bearing for one side of a substantially vertical flange of the safety bar, said deflected portion being adapted for firm seating against the bottom of the spring plank and having an opening for the passage of a locking member.

6. A supporting bracket for safety bars and the like, characterized by a web portion adapted to depend from a spring plank and disposed in substantially the plane of the side edge of the spring plank, said web being apertured for the reception of a safety bar, and having a deflected portion beside the aperture formed into inwardly extending flanges, one of the flanges being adapted to bear against the bottom of the spring plank, and another flange providing an extended bearing surface for one side of the safety bar.

7. A car-truck having a spring plank and inside hung brake-beams, an auxiliary or emergency safety bar extending longitudinally below and normally free of said beams, and means removably securing said bar to the spring plank, said means comprising metallic brackets suspended from the side flanges of the spring plank, said brackets being characterized by apertured webs for the reception and support of the safety bars, and each of said brackets having a pair of relatively perpendicular flanges, one of which bears against the lower side of the spring plank, and the other flange forming an extended flat bearing surface for one side of the safety bar.

8. A supporting bracket for safety bars and the like comprising a metallic member adapted to be secured to the spring plank of a car truck, the lower portion of said member having an aperture corresponding in configuration with the cross-sectional configuration of a flanged safety bar, and a deflected portion adjacent the upper end of said aperture for bearing against the underside of a substantially horizontal flange of the safety bar.

9. A supporting bracket for safety bars, and the like, comprising a metallic member adapted to be secured to the spring plank of a car truck, the lower portion of said member having an aperture corresponding to a cross-sectional configuration of a flanged safety bar, and an inwardly deflected portion adjacent said aperture partially seating against the bottom of the spring plank and partially spaced therefrom to provide a seat for the lower side of a horizontal flange of the safety bar.

10. A supporting bracket for safety bars and the like, comprising a metallic member adapted to be secured to the spring plank of a car truck, the lower portion of said member having an aperture corresponding to the cross-sectional configuration of a flanged safety bar, and an inwardly deflected portion adjacent said aperture partially seating against the bottom of the spring plank, and partially spaced therefrom to provide a seat for the lower side of a horizontal flange of the safety bar, and an additional deflected portion providing a flat bearing surface for a substantially vertical flange of the safety bar.

SETH A. CRONE.